United States Patent Office 2,721,198
Patented Oct. 18, 1955

2,721,198

AMINE SALTS OF PENICILLIN

Joseph Thomas Alberi, Red Lodge, Mont., assignor to Bristol Laboratories Inc., Syracuse, N. Y., a corporation of New York No Drawing. Application August 27, 1953,
Serial No. 376,967

4 Claims. (Cl. 260—239.1)

The present invention relates to new, non-toxic, water-insoluble, amine salts of penicillin, more particularly penicillin salts of para-aminobenzophenone, para-aminoacetophenone, and para-aminopropiophenone, which are capable of exerting a repository antibiotic action and are also useful for oral, therapeutic administration and for external application and for use as a supplement in animal and poultry feeds.

This application is a continuation-in-part of my prior co-pending applications of Serial Nos. 304,651, 304,653, and 304,655, filed on August 15, 1952, all now abandoned.

The new penicillin salts of the present invention have the following formula

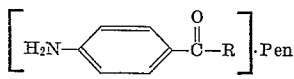

where Pen designates an acid penicillin radical and R represents a member selected from the group consisting of phenyl, methyl, and ethyl.

The products of the present invention may be obtained by reaction of penicillin acid with para-aminobenzophenone, para-aminoacetophenone, or para-aminopropiophenone in a water-immiscible organic solvent and by the metathetical reaction of a water-soluble penicillin salt and a water-soluble salt of para-aminobenzophenone, para-aminoacetophenone, or para-aminopropiophenone.

A more comprehensive understanding of this invention is obtained by reference to the following examples.

EXAMPLE I

*Salt of penicillin G and para-aminobenzophenone*

Para-aminobenzophenone hydrochloride (0.8 g.) is suspended in 5 cc. water and added to a solution of 0.2 grams of sodium penicillin G in 6.0 cc. water. Upon scratching and cooling, the crystalline salt of penicillin G and para-aminobenzophenone precipitates and is collected by filtration. This salt has a potency of about 1110 units/mgm. and is soluble in water at room temperature to the extent of about 530 units/ml.

EXAMPLE II

Potassium penicillin G (18.6 g.; 0.05 mole) is shaken with 75 ml. of 8.5% phosphoric acid and 150 ml. of ether in the cold until two clear layers result. The aqueous layer is withdrawn and discarded. The ether solution is filtered and then added all at once to a cold solution of 0.04 moles (7.9 g.) of para-aminobenzophenone in 50 ml. of ether. Crystalline penicillin G salt of para-aminobenzophenone precipitates and is collected by filtration.

EXAMPLE III

Purified para-aminobenzophenone (10.6 g.) is dissolved in the minimum amount of acetone. To this solution is added the ethereal extract prepared by dissolving potassium penicillin G (20 g.) in water, acidifying to pH 1.95 with concentrated phosphoric acid, extracting with ether and discarding the aqueous layer. The resulting solution made by mixing the above solutions in acetone and in ether is air-blown to near dryness and the residual gum is triturated in dry ether. Crystals of the penicillin G salt of para-aminobenzophenone form and are removed mechanically. This salt is soluble in water at room temperature to the extent of about 527 units/ml.

EXAMPLE IV

*Salt of penicillin G and para-aminoacetophenone*

Para-aminoacetophenone hydrochloride (0.5 g.) is suspended in 5 cc. water and added to a solution of 0.2 gram of sodium penicillin G in 6.0 cc. water. Upon scratching and cooling, the crystalline salt of penicillin G and para-aminoacetophenone precipitates and is collected by filtration. This salt has a potency of about 1260 units/mgm. and is soluble in water at room temperature to the extent of about 90 units/ml.

EXAMPLE V

Potassium penicillin G (18.6 g.; 0.05 mole) is shaken with 75 ml. of 8.5% phosphoric acid and 150 ml. of ether in the cold until two clear layers result. The aqueous layer is withdrawn and discarded. The ether solution is filtered and then added all at once to a cold solution of 0.04 mole (5.4 g.) of para-aminoacetophenone in 50 ml. of ether. Crystalline penicillin G salt of para-aminoacetophenone precipitates and is collected by filtration.

EXAMPLE VI

Potassium penicillin G (33 g.) is dissolved in 50 ml. distilled water, acidified to pH 2 with concentrated phosphoric acid and extracted with 100 ml. of ether and the aqueous layer is discarded. The ethereal layer is added to a solution in 65 ml. of methyl isobutyl ketone of 9.45 g. para-aminoacetophenone. After cooling overnight in the icebox, the crystalline salt of penicillin G and para-aminoacetophenone precipitates and is separated by filtration. This salt is soluble in water at room temperature to the extent of about 90 Oxford units/ml.

EXAMPLE VII

*Salt of penicillin G and para-aminopropiophenone*

Para-aminopropiophenone hydrochloride (0.56 g.) is suspended in 5 cc. water and added to a solution of 0.2 gram of sodium penicillin G in 6.0 cc. water. Upon scratching and cooling, the crystalline salt of penicillin G and para-aminopropiophenone precipitates and is collected by filtration. This salt has a potency of about 1220 units/mgm. and is soluble in water at room temperature to the extent of about 910 units/ml.

EXAMPLE VIII

Potassium penicillin G (18.6 g.; 0.05 mole) is shaken with 75 ml. of 8.5% phosphoric acid and 150 ml. of ether in the cold until two clear layers result. The aqueous layer is withdrawn and discarded. The ether solution is filtered and then added all at once to a cold solution of 0.04 mole (6.0 g.) of para-aminopropiophenone in 50 ml. of ether. Crystalline penicillin G salt of para-aminopropiophenone precipitates and is collected by filtration.

EXAMPLE IX

Para-aminopropiophenone is dissolved in 25 ml. of hot methyl isobutyl ketone. To this solution is added the ethereal extract prepared by dissolving 10 g. potassium penicillin G in 200 ml. water, acidifying to pH 2.0 with concentrated phosphoric acid, extracting with 250 ml. ether and discarding the aqueous layer. The resulting solution made by mixing the above solutions in methyl isobutyl ketone and ether is cooled, seeded and allowed to stand in the ice-box. Crystals of the penicillin G salt of para-aminopropiophenone separate, are removed by filtration and dried in vacuo. This salt is soluble in water at room temperature to the extent of about 910 units/ml.

While the present invention has been described with particular reference to the para-aminobenzophenone, para-aminoacetophenone, or para-aminopropiophenone salts of penicillin G it will be understood that the para-aminobenzophenone, para-aminoacetophenone, or para-aminopropiophenone salts of other penicillins are also included within the scope of this invention. For instance, penicillins such as the penicillins G, F, X, dihydro F, O, and K and mixtures of two or more such penicillins, particularly such mixtures containing at least 85% of penicillin G, are included within the scope of this invention.

It will be understood that the reaction can be carried out in water-immiscible organic solvents other than ether. Examples of such solvents are butanol, amyl acetate, methyl amyl acetate, isopropyl ether, mesityl isobutyl ketone, methylene dichloride, ethylene dichloride and chloroform. Recovery of the products may be increased by evaporating the solvent in vacuo at low temperatures.

It will be understood also that the ethereal solution of the free base may be prepared in ether by the use of caustic to liberate the free amine from an organic-solvent soluble or water soluble salt such as the hydrochloride, phosphate, nitrate, hydrobromide, sulfate, citrate, acetate, and tartrate.

The compounds of the present invention are therapeutically effective veterinary compounds and are useful in treating diseases in animals caused by penicillin susceptible organisms.

It will be understood that, without departing from the spirit of the invention or the scope of the claims, various modifications may be made in the specific expedients described as these are illustrative only.

I claim:

1. A salt of penicillin and a member selected from the group consisting of para-aminobenzophenone, para-aminopropiophenone, and para-aminoacetophenone.
2. A salt of penicillin G and para-aminobenzophenone.
3. A salt of penicillin G and para-aminopropiophenone.
4. A salt of penicillin G and para-aminoacetophenone.

References Cited in the file of this patent

UNITED STATES PATENTS

| | | |
|---|---|---|
| 2,515,898 | Rhodehamel | July 18, 1950 |
| 2,550,398 | Barol | Apr. 24, 1951 |